United States Patent [19]

Matthiessen

[11] 3,850,451

[45] Nov. 26, 1974

[54] SAFETY SHIELD FOR FLANGED PIPE COUPLING

[76] Inventor: Roy A. Matthiessen, 30 Sandy Hill Rd., Westfield, N.J. 08610

[22] Filed: Feb. 2, 1973

[21] Appl. No.: 329,028

[52] U.S. Cl. .................................. 285/13, 285/45
[51] Int. Cl. ............................................ F16l 55/00
[58] Field of Search ............... 285/45, 13, 293, 423; 138/99; 128/165, 169–171, 327

[56] References Cited
UNITED STATES PATENTS

| | | | |
|---|---|---|---|
| 1,303,903 | 5/1919 | Jonsen | 128/169 |
| 1,357,894 | 11/1920 | Pearsall | 285/293 X |
| 1,959,421 | 5/1934 | Hordesty | 285/293 X |
| 2,417,741 | 3/1947 | Dillon | 138/99 X |
| 2,708,123 | 5/1955 | Risley et al. | 285/45 |
| 3,100,658 | 8/1963 | Miller et al. | 285/293 X |
| 3,113,790 | 12/1963 | Matthiessen | 285/45 |
| 3,527,479 | 9/1970 | Matthiessen | 285/45 |

FOREIGN PATENTS OR APPLICATIONS

| | | | |
|---|---|---|---|
| 831,746 | 2/1952 | Germany | 128/171 |

Primary Examiner—Dave W. Arola

[57] ABSTRACT

An elongated body includes a strip of aluminized or fiberglass cloth to be wrapped around a pipe coupling, one or more liner strips, and means for separably fastening its ends together, the liner strips being loosely slidable relatively to the body during wrapping of the assembly of the body and liner strips around the pipe coupling; and specifically the liner strips are held against displacement from the body by flexible narrow straps that have their end secured to the body and extend transversely of the body and overlie the liner strips.

6 Claims, 12 Drawing Figures

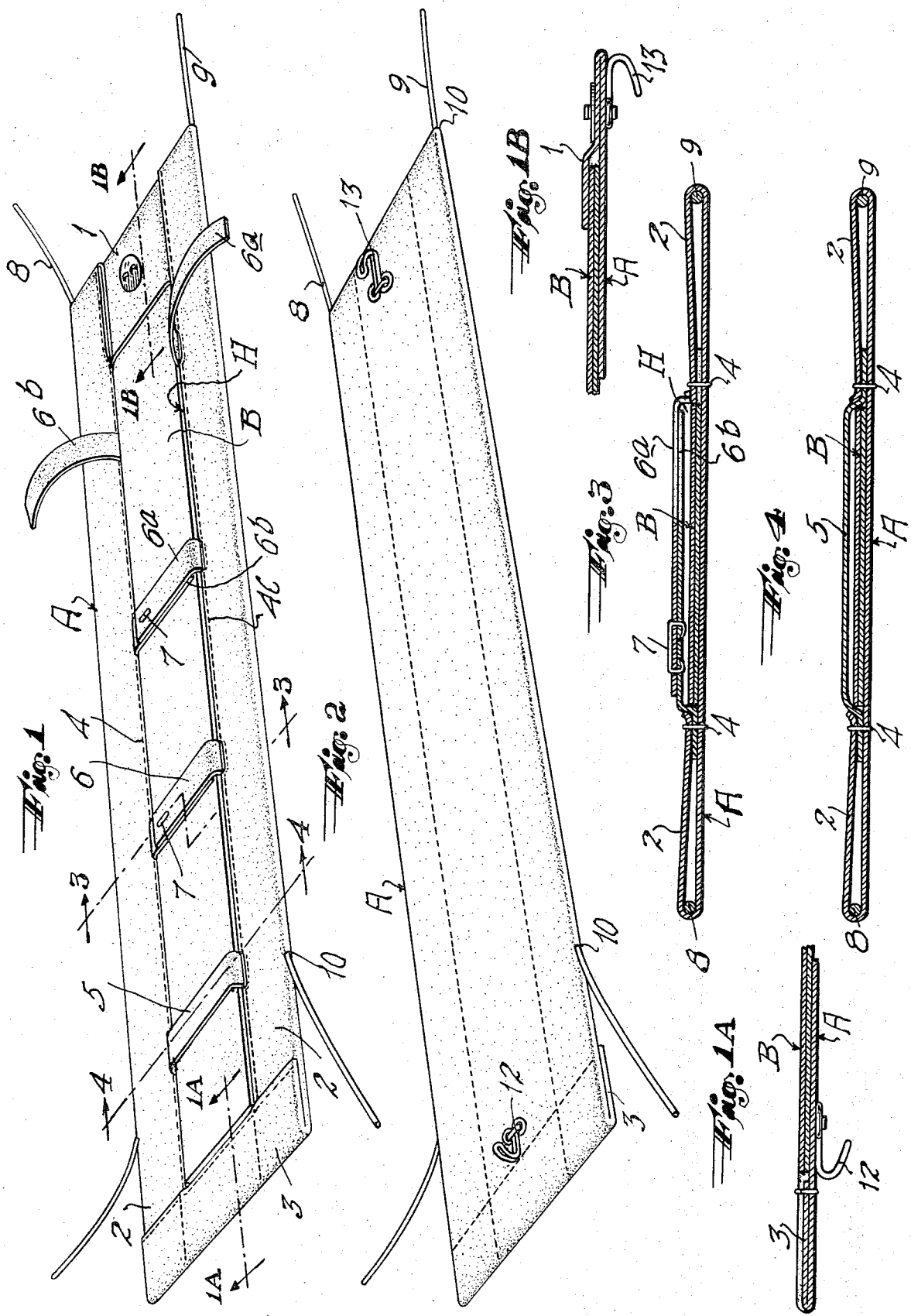

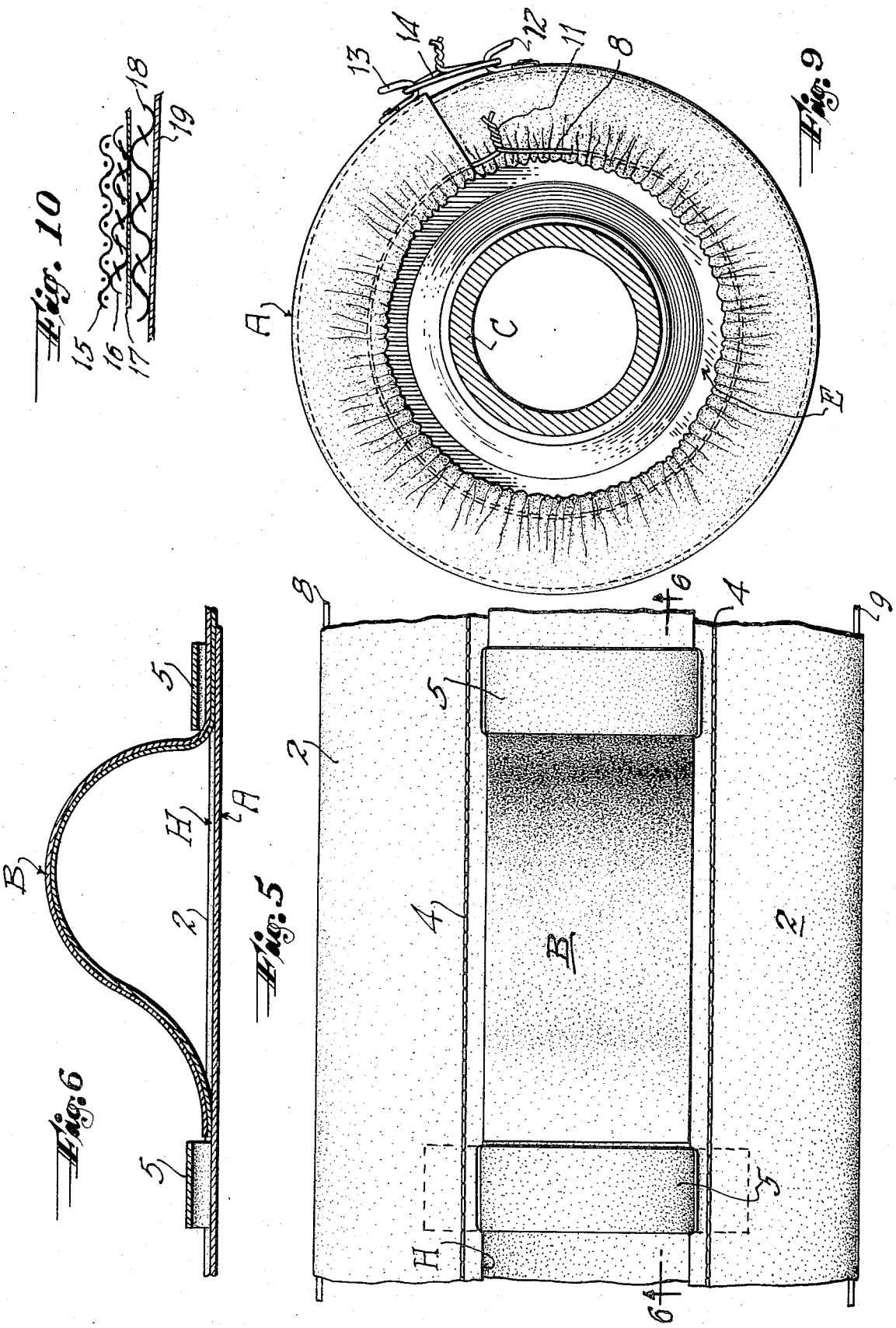

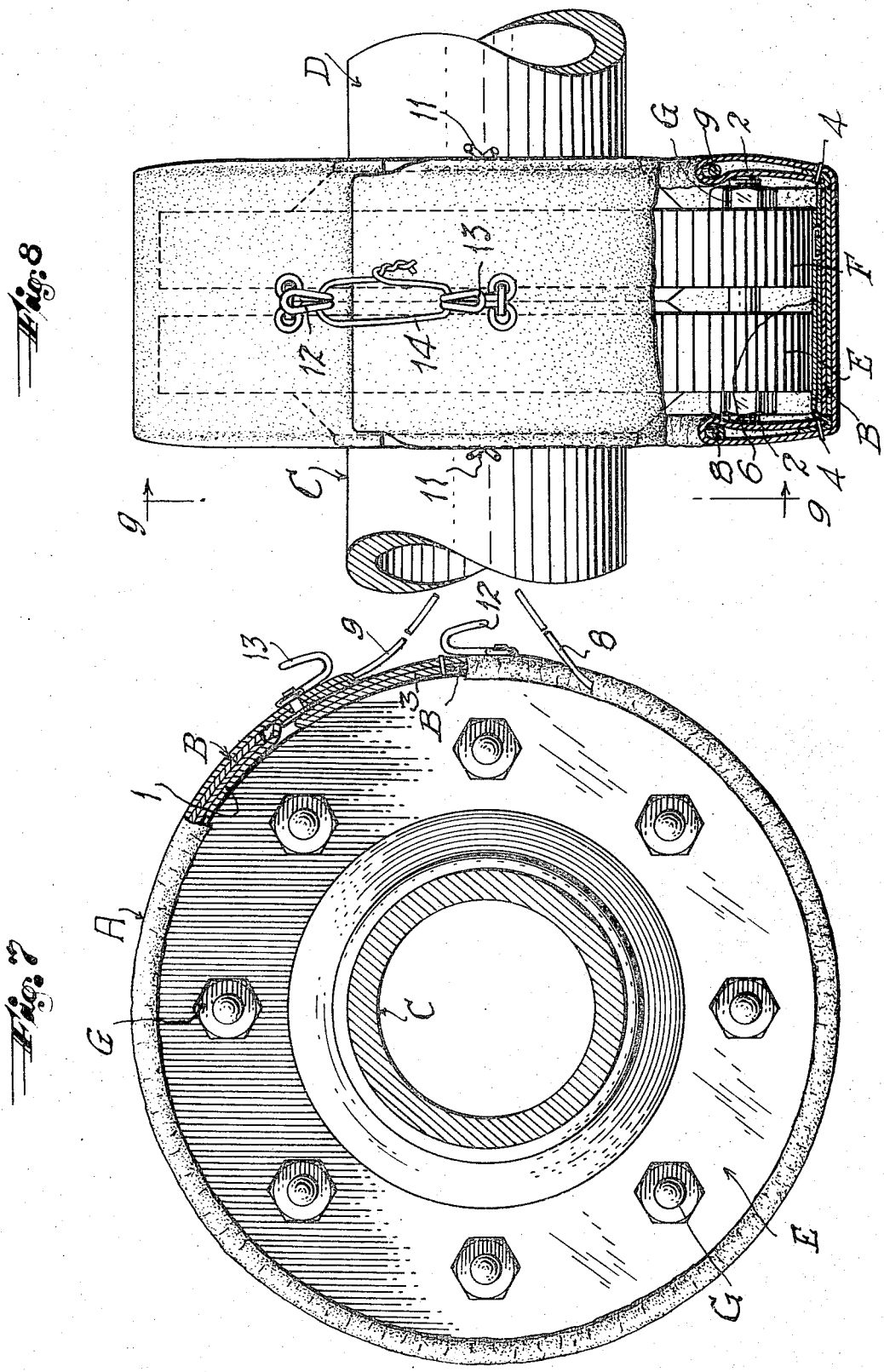

SAFETY SHIELD FOR FLANGED PIPE COUPLING

BACKGROUND OF THE INVENTION

This invention relates in general to a shield for intercepting leakage from pipe joints and, particularly, such leakage under pressure as might be incidental to the blowing of a gasket in a flanged pipe coupling, so as to prevent spraying or splashing of the liquid over workmen or objects in the vicinity of the pipe coupling.

Many efforts have been made to produce such a shield in the form of a casing or a wrapper to be applied in surrounding relation to a joint or connection in a pipe line, one type of shield comprising an elongated pliable body formed of a strip of aluminized asbestos or glass cloth to be wrapped around a coupling with the body ends separably fastened together, the body being of width greater than the coupling and having draw strings, preferably copper wire, to pull the longitudinal edge portions of the body into juxtaposed relation to the side surfaces of the coupling. Such shields also include one or more liner strips such as steel wire mesh, aluminized asbestos cloth, aluminized glass cloth screen, etc., which are secured to the body by stitches along the longitudinal edges of the strips.

While the known cloth shields are useful for the intended purpose, they leave much to be desired in that the liner strips ripple or buckle as the shields are wrapped around the couplings and the liners do not snugly contact the outer peripheral surfaces of the coupling flanges, so that liquid may easily leak or spray through the spaces between the liners and the coupling flanges.

Also after the liners have been stitched into the body, they cannot be adjusted or removed for replacement without complete destruction of the shields.

SUMMARY OF THE INVENTION

One object of the present invention is to provide a pipe flange safety shield which overcomes the objections to and disadvantages of the prior cloth shields and which comprises a novel and improved construction and combination of a flexible or pliable body and one or more liner strips wherein the liner strip has a minimum or no tendency to ripple or buckle as the body and associated liner strip are wrapped around the flanges of a pipe coupling.

Other objects of the invention are to provide a novel and improved manner of associating the liner strip with the body without stitching or similar fastener means and thus to separably attach the liner strip to the body so that the liner strip may move bodily relatively to the body during the wrapping of the assembled body and liner strips around the flanges of a pipe coupling.

The invention also contemplates a body comprising a strip of cloth having its longitudinal edge portions inturned toward each other with their edges parallel and spaced apart providing a channel or guideway for the liner strip which may comprise a plurality of layers of sheet material, and a plurality of guide and holding straps secured at their ends to the body and extending transversely of said channel and beneath which said liner strip is freely slidable, so that the holding straps prevent displacement of the liner strip from the body but permit movement of the liner lengthwise in said channel beneath the straps and thereby limit the tendency of the liner to ripple or buckle during the wrapping of the shield around pipe coupling flanges.

A BRIEF DESCRIPTION OF THE DRAWINGS

For a more complete understanding of the invention, reference should be had to the following description in conjunction with the accompanying drawings in which:

FIG. 1 is a top perspective view of a pipe coupling shield embodying the invention in flat condition prior to wrapping thereof around a pipe coupling and with one of the liner holding straps in partially completed condition;

FIG. 1A is a fragmentary longitudinal vertical sectional view on the plane of the line 1A—1A of FIG. 1;

FIG. 1B is a view similar to FIG. 1A taken on the plane of the line 1B of FIG. 1;

FIG. 2 is a bottom perspective view of the shield;

FIG. 3 is an enlarged transverse vertical sectional view approximately on the plane of the line 3—3 of FIG. 1;

FIG. 4 is a similar view approximately on the plane of the line 4—4 of FIG. 1;

FIG. 5 is an enlarged fragmentary top plan view of a portion of the shield showing the manner of threading liner strips beneath the holding straps in attaching the liner strips to the shield body;

FIG. 6 is a vertical longitudinal sectional view approximately on the plane of the line 6—6 of FIG. 5;

FIG. 7 is a side elevational view of a flanged pipe coupling and the shield partially applied thereto before pulling of the edge portions of the shield over the edges of the coupling flanges;

FIG. 8 is a front elevation of the liner completely applied to the coupling and showing portions of the liner broken away and illustrated in cross-section;

FIG. 9 is a side elevational view, on a reduced scale, of the assembled shield and coupling viewed approximately from the plane of the line 9—9 of FIG. 8; and, FIG. 10 is a greatly enlarged fragmentary vertical sectional view of a possible construction and assembly of liner strips.

DESCRIPTION OF THE PREFERRED EMBODIMENTS

For the purpose of illustrating the principles of the invention, the shield has been shown in connection with a known type of flanged pipe coupling that includes two pipe sections C and D that have secured thereto in the usual manner the respective flanges E and F that are separably fastened together by bolts G, each with one end face in liquid-tight abutting relation to the corresponding face of the other flange and generally with a gasket between the flanges.

The pipe coupling shield is shown as including a body A and at least one liner strip B separably secured to the body. The body may be formed of suitable material, for example, aluminized glass cloth such as cloth formed of glass fibers having a thin coating of aluminum applied to one side thereof; and the strip is of a length to suit the pipe coupling to be protected so that the body and the liner strip can be wrapped around the circumferential surfaces of the coupling flanges and have its ends overlapped and secured together, and the body is of sufficient width to allow the longitudinal edge portions to be folded over the edges of the coupling flanges and against the outer faces of the flanges.

Frequently and particularly in industrial plants leaks occur in the joint between the coupling flanges, and where liquid under high pressure is flowing through the coupling, the liquid is sometimes caused to squirt in a jet or stream under high pressure from a leak or a weak spot in the joint, for example, upon blowing out of a portion of a gasket. It is the purpose of the present invention to provide a novel and improved shield to protect persons and objects in the vicinity of such a leaking pipe joint, from being struck, and possibly injured, from such escaping liquid.

The body comprises a one-piece elongated strip of material that has one end portion inwardly folded over the main portion as indicated at 1, and the strip has its longitudinal edge portions folded inwardly over the main portion as indicated at 2, while the other end portion of the strip is inwardly folded as indicated at 3 into overlying relation to the infolded edge portions 2. The inner edges of the inturned edge portions 2 are disposed in widely spaced and parallel relation to each other to provide a channel H between them to freely receive the liner strips B which preferably are of a width somewhat greater than the width of the coupling as shown in FIG. 8, the infolded edge portions 2 being secured to the main portion of the body strip by longitudinal lines of stitching 4 that may be formed of suitable thread such as wire inserted asbestos yarn or fiberglass yarn.

The body and the liner strips are flexible or pliable so that they may be easily wrapped around the coupling flanges as shown in FIGS. 7, 8 and 9 and the liner strips are attached to the body in such a way that they may slide relatively to the body so that there is a minimum or no tendency of the liner strips to fold, ripple, buckle or "bunch up" as the body and associated liner strips are wrapped around the flanges of the pipe coupling and the liner strips snugly contact the circumferential surfaces of the coupling flanges to restrict leakage of liquid from the joint between the flanges. In the example, here shown, the liner strips B are of a width approximately the same as the channel H and of a length so that one end thereof approximately abuts the inturned end portion 3 of the body while the other end is tucked beneath the inturned end portion 1 of the body as best shown in FIGS. 1A and 1B, respectively.

The liner strips are held against unintended displacement from the body and at the same time are permitted to freely slide relatively to the body, by guiding and holding straps each of which may be formed of one piece of material as indicated at 5 or of two strips of material 6 and 6A secured together in any suitable way as by staplers 7. The ends of the straps are secured to the body between the main portion of the body and the inturned longitudinal edge portions 2 by the stitches 4 as best shown in FIGS. 3 and 4.

Where the straps are formed of one piece of material, they are secured to the body in transverse relation to the channel H and the liner strips are threaded beneath the strips as illustrated, for example, in FIGS. 5 and 6 where one end of the liner strip B has been threaded beneath one holding strap 5 and its end is about to be threaded between another holding strap 5 shown at the lefthand side of FIGS. 5 and 6. Where the straps are formed of two sections 6 and 6A, the two sections are initially spread apart as shown at the right hand end of FIG. 1 and the liner strips are laid between the strap sections, after which the two sections 6 and 6A are moved into superposed relation to each other in overlying relation to the liner strip and secured together by suitable means such as the staple 7. With this construction it will be readily seen that during the flexing or wrapping of assembled body and liner strips, these strips are freely longitudinally slidable relatively to the body or lengthwise in the channel H so that the strips are both held against displacement from the body and also the tendency of the liner strips to fold, bunch up, ripple or buckle during the wrapping of the shields of pipe coupling flanges, is prevented or reduced to the minimum.

For the purpose of securing the shield in position on the coupling flanges, flexible wires 8 and 9, preferably soft copper wires serving as draw-strings, are inserted in the folds between the main portion and the longitudinal inturned edge portions 2 of the body with their ends extending through apertures 10 in the body. The wires are of sufficient length to permit the body to be wrapped around the flanges as shown in FIG. 7 with the wires extending outwardly from the body, and after which the ends of each wire are twisted together as indicated at 11 so as to firmly draw and hold the edge portions of the body inwardly of the coupling flanges and against the faces thereof as best shown in FIGS. 8 and 9. The end portions of the body are in overlapped relation to each other, and to hold them against separation, hooks 12 and 13 are riveted to the body in spaced relation to the extremities of the body, respectively, and a wire 14 is looped around the hooks with its ends twisted together as best shown in FIG. 8.

The liner strips may be formed of any suitable material, for example one strip may comprise wire mesh 15 while another strip 16 may comprise glass cloth having a coating of aluminum 17 thereon, and as above indicated. The body may comprise a glass cloth layer 18 having an aluminum coating 19. Teflon coated glass cloth may be used also. Any desired number of liner strips may be superposed on the body and in some cases all of the strips may consist of aluminized glass cloth or some other suitable material that will break up the leak in the pipe coupling. Also any desired number and spacing of holding straps may be employed, depending upon the length of the shield body.

The invention enables the interchange of the liner strips easily and quickly in addition to ensuring that the liner strips will not ripple or buckle in such a manner as to leave gaps between them and the circumferential surfaces of the coupling flanges that might occur if the liner strips were not free to slide relatively to the body during the application of the shield to coupling flanges, and consequently the liner strips snugly contact the coupling flanges and effectively restrict liquid leakage from the coupling.

Other modifications and changes in the construction of the shield will occur to those skilled in the art as within the spirit and scope of the invention, and the specific constructions herein shown are primarily for the purposes of illustrating the principles of the invention.

I claim:

1. A shield for a pipe joint comprising an elongated one-piece pliable fabric body of a length and width to be wrapped around a pipe coupling with its ends overlapped, means for separably connecting said ends together, a pliable fabric liner strip confined wholly within the boundries of said body and extending centrally longitudinally of said body and slidably contacting one side of the body, and means separably holding said liner strip on the body against unintended displacement therefrom and providing for relatively longitudinal sliding of said liner strip and said body during wrapping of the shield around a pipe coupling.

2. A shield as defined in claim 1 wherein the means for attaching the liner to the body comprises holding straps extending transversely of said body with their ends secured to the body and with their intermediate portions loosely overlying said liner strip and holding said liner strip against displacement from the body and providing for free longitudinal sliding of the liner relatively to the body.

3. A shield as defined in claim 2 wherein the body has longitudinal edge portions folded inwardly over the main portion providing a channel between the inner margins of said folded edge portions in which said liner strip is slidably disposed, and the end portions of said holding straps are secured between said folded edge portions and the main portion of the body while the intermediate portions of said straps loosely overlie said liner strip.

4. A shield as defined in claim 2 wherein one end portion of said body is infolded over the main portion and one end of the liner strip is loosely received between said infolded portion and the main portion.

5. A shield as defined in claim 2 wherein one end portion of said body is infolded over the main portion and one end of the liner strip is loosely received between said infolded portion and the main portion and wherein the other end portion of the body is folded inwardly and the corresponding end of the liner strip is in spaced juxtaposed relation to the inner margin of said inwardly folded portion.

6. A shield for a pipe joint as defined in claim 3, with the addition of draw strings disposed in the folds between said inwardly folded edge portions and the main portion of the body, having its ends projecting through apertures in the body for drawing said edge portions and the main portion around the pipe joint and adapted to have their ends separably connected together.

* * * * *